US012227284B2

(12) United States Patent
Jedliński et al.

(10) Patent No.: US 12,227,284 B2
(45) Date of Patent: Feb. 18, 2025

(54) PITCH CHANGE MECHANISM FOR AN AIRCRAFT ENGINE

(71) Applicant: General Electric Company Polska sp. z o.o., Warsaw (PL)

(72) Inventors: Krzysztof Jedliński, Raszyn (PL); Mirosław Sobaniec, Grodzisk Mazowiecki (PL); Mateusz Gołdyn, Warsaw (PL); Tomasz Biwański, Koszalin (PL); Tomasz Kosieradzki, Michałowice (PL); Dariusz Łodkowski, Warsaw (PL)

(73) Assignee: General Electric Company Polska sp. z o.o., Warsaw (PL)

( * ) Notice: Subject to any disclaimer, the term of this patent is extended or adjusted under 35 U.S.C. 154(b) by 0 days.

(21) Appl. No.: 18/415,155

(22) Filed: Jan. 17, 2024

(65) Prior Publication Data

US 2025/0019065 A1   Jan. 16, 2025

(30) Foreign Application Priority Data

Jul. 10, 2023  (PL) .......................................... 445528

(51) Int. Cl.
*B64C 11/30*      (2006.01)
*B64C 11/06*      (2006.01)

(52) U.S. Cl.
CPC ............ *B64C 11/305* (2013.01); *B64C 11/06* (2013.01)

(58) Field of Classification Search
CPC ....... B64C 11/305; B64C 11/06; B64C 11/38; B64C 11/30; F01D 7/00
See application file for complete search history.

(56) References Cited

U.S. PATENT DOCUMENTS

| 2,592,124 A | 4/1952 | Diefenderfer |
| 2,882,975 A | 4/1959 | Hirsch et al. |
| 5,364,231 A | 11/1994 | Eick et al. |
| 6,981,844 B2 * | 1/2006 | Perkinson ............... B64C 11/40 416/157 R |
| 8,439,640 B2 * | 5/2013 | Arel ........................ B64C 11/40 416/157 R |

(Continued)

FOREIGN PATENT DOCUMENTS

| FR | 3127269 A1 | 3/2023 |
| FR | 3130896 A1 | 6/2023 |

(Continued)

*Primary Examiner* — Courtney D Heinle
*Assistant Examiner* — Ryan C Clark
(74) *Attorney, Agent, or Firm* — Venable LLP; Michele V. Frank

(57) ABSTRACT

A pitch change mechanism for an aircraft engine includes a unison ring, a plurality of crankshafts coupled to the unison ring and configured to receive a plurality of blades, an inner shaft coupled to the plurality of crankshafts and the unison ring, and an actuator cylinder and an actuator piston. The actuator cylinder is coupled to the inner shaft and is configured to move relative to the actuator piston along a longitudinal axis of the pitch change mechanism. Movement of the actuator cylinder relative to the actuator piston is transferred to a rotation of each of the plurality of crankshafts around a longitudinal axis of each of the plurality of crankshafts to change a pitch of the plurality of blades.

20 Claims, 3 Drawing Sheets

(56) References Cited

U.S. PATENT DOCUMENTS

| | | | |
|---|---|---|---|
| 10,472,050 B2 | 11/2019 | Futa, Jr. et al. | |
| 10,577,078 B2 | 3/2020 | Chapman | |
| 10,683,082 B2* | 6/2020 | Lassalle | B64C 11/40 |
| 10,745,111 B2* | 8/2020 | Lassalle | F15B 5/006 |
| 10,994,837 B1 | 5/2021 | Cravener et al. | |
| 11,161,597 B2 | 11/2021 | Lauria et al. | |
| 11,667,374 B2* | 6/2023 | Prunet | B64C 11/36 |
| | | | 416/147 |
| 2007/0081897 A1* | 4/2007 | Raes | B64C 11/06 |
| | | | 416/134 A |
| 2011/0002786 A1* | 1/2011 | Perkinson | B64C 11/38 |
| | | | 416/154 |
| 2017/0066522 A1* | 3/2017 | Curnock | B64C 11/32 |
| 2018/0043990 A1* | 2/2018 | Tajan | F01D 7/00 |
| 2018/0335047 A1* | 11/2018 | Charier | F04D 29/323 |
| 2019/0031319 A1 | 1/2019 | Calkins et al. | |

FOREIGN PATENT DOCUMENTS

| | | |
|---|---|---|
| FR | 3130897 A1 | 6/2023 |
| FR | 3133367 A1 | 9/2023 |
| FR | 3133368 A1 | 9/2023 |

\* cited by examiner

PITCH CHANGE MECHANISM FOR AN AIRCRAFT ENGINE

CROSS REFERENCE TO RELATED APPLICATIONS

The present application claims the benefit of Polish Patent Application No. P.445528, filed on Jul. 10, 2023, which is hereby incorporated by reference herein in its entirety.

TECHNICAL FIELD

The present disclosure relates generally to a pitch change mechanism for an aircraft engine.

BACKGROUND

Current propeller blade pitch change mechanisms rely on a counterweight system to rotate the propeller blades toward a feather position due to centrifugal force.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Figure 1:
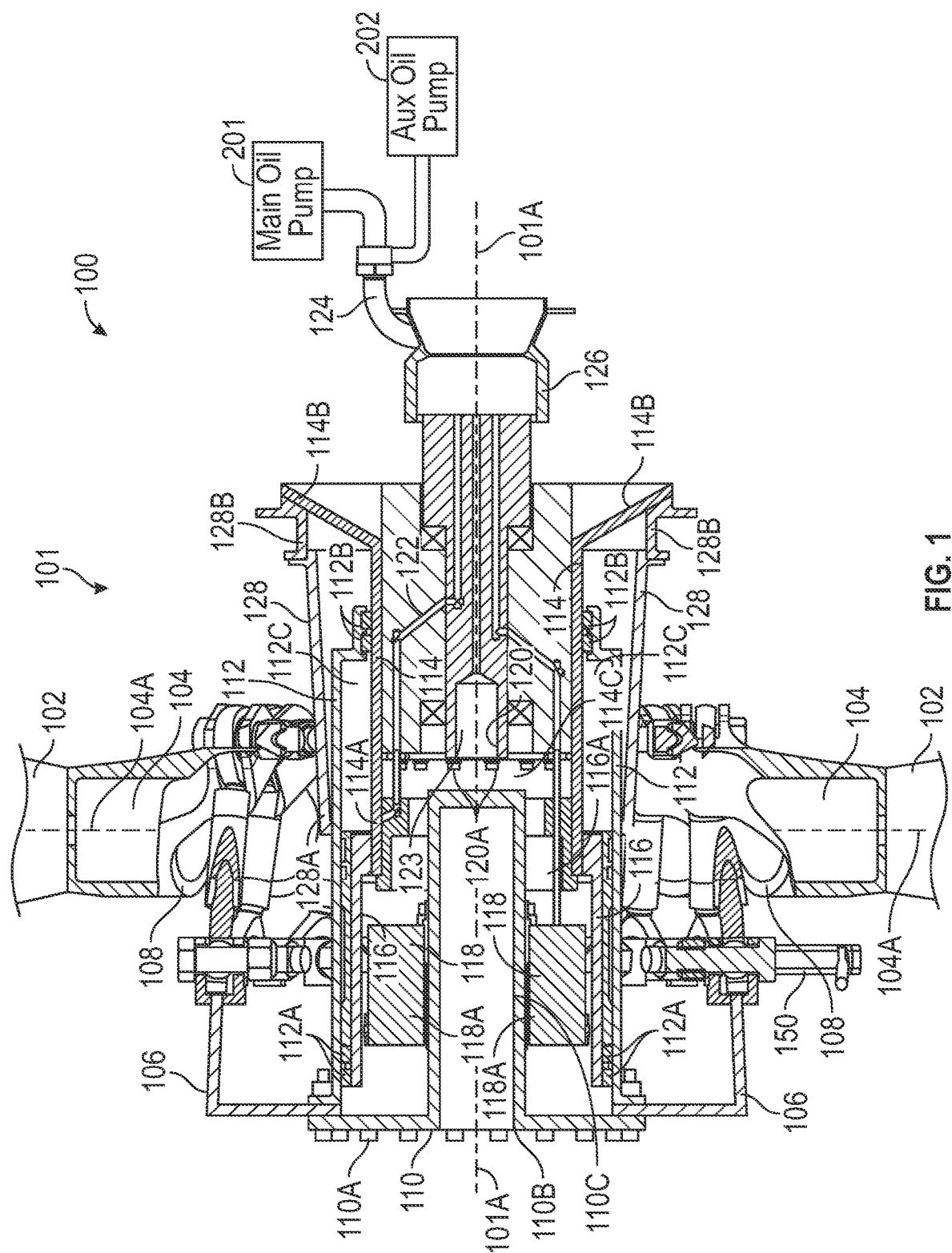
FIG. 1 is a longitudinal cross-sectional view of a pitch change mechanism of an aircraft engine for changing the pitch of a plurality of blades of the aircraft engine, according to an embodiment of the present disclosure.

Additional features, advantages, and embodiments of the present disclosure are set forth or apparent from a consideration of the following detailed description, drawings, and claims. Moreover, both the foregoing summary of the present disclosure and the following detailed description are exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and the scope of the present disclosure.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value.

As used herein, the terms "axial" and "axially" refer to directions and orientations that extend substantially parallel to a centerline of the aircraft engine or the combustor. Moreover, the terms "radial" and "radially" refer to directions and orientations that extend substantially perpendicular to the centerline of the aircraft engine or a fuel-air mixer assembly.

A pitch change mechanism can be used to change the pitch of a blade of an aircraft. Pitch change orients the blade relative to incoming airflow. When an aircraft is stationary with the propeller spinning (in relatively calm air), the airflow vector for each blade is mainly from a side of the blade (feather position). However, as the aircraft starts to move forward, the relative airflow vector increasingly faces a front edge of the blade. To maintain an angle of attack of the blade relative to the airflow, the pitch of the blade is adjusted towards a fine position.

The first propeller engines were provided with propeller blades having a fixed pitch. These propeller engines were not, however, efficient over a range of flight conditions. For example, if the angle of the propeller blade is set for takeoff and climb performance, the propeller engine will be inefficient in cruising flight, because the propeller blade will have a low angle of attack. On the other hand, if the angle of the propeller blade is set for cruise performance, the propeller engine may stall at lower speeds, because the propeller blade will have too high of an angle of attack. Therefore, a propeller engine with an adjustable propeller blade angle is more efficient over a range of conditions for operating the aircraft engine. A propeller engine provided with propeller blades having a variable pitch can have a nearly constant efficiency over a range of airspeed.

The present mechanism for changing the pitch of a blade uses a combination of pitch change mechanism functional features controlled by an integrated system and can be accomplished by a hydraulic dual channel axial actuator, an electrically driven auxiliary feathering pump, an oil transfer bearing, and one or more oil channels, as will be described further in detail in the following paragraphs. This arrangement eliminates counterweights and reduces weight and, thus, increases fuel efficiency.

The axial actuator is configured to rotate with the propeller shaft and includes an axially movable cylinder connected to blades via linkage yokes. The axial movement of the actuator cylinder is transferred to a change in the pitch angle of the blades. Oil is supplied the actuator at a pressure through an oil transfer bearing with the engine oil in a normal operating mode, or by an auxiliary hydraulic pump electrically driven with a separate auxiliary oil reservoir in the event of an engine oil pressure drop. The auxiliary oil reservoir can be located, for example, in a space inside a main engine oil tank, as a tank inside a tank configuration. A pitch lock function is accomplished by a hydraulic system or a mechanical lock controlled by the system.

FIG. 1 is a cross-sectional of a pitch change mechanism 101 of an aircraft engine 100 for changing the pitch of a plurality of blades of the aircraft engine 100, according to an embodiment of the present disclosure. The term "aircraft engine" is used herein to include, but is not limited to, an open fan engine, an unducted fan engine, or any engine having blades outside a nacelle of the aircraft engine, a propeller engine, or a turboprop engine, etc. FIG. 1 shows a pitch change mechanism 101 of the aircraft engine 100. The aircraft engine 100 includes a plurality of blades 102. The plurality of blades 102 are coupled to the pitch change mechanism 101. The plurality of blades 102 extend radially from the pitch change mechanism 101. The pitch change mechanism 101 has a plurality of crankshafts 104. The plurality of crankshafts 104 are configured to receive the plurality of blades 102. Each of the plurality of blades 102 is linked to a corresponding one of the plurality of crankshafts 104. Each crankshaft 104 is configured to rotate around its longitudinal axis 104A, which generally corresponds to a longitudinal axis of the propeller blade 102. The pitch change mechanism 101 further includes a unison ring 106. Each of the plurality of crankshafts 104 is coupled to the unison ring 106 by a corresponding linkage yoke in a plurality of linkage yokes 108.

The pitch change mechanism 101 also includes an inner shaft 110. The unison ring 106 is coupled to the inner shaft 110. For example, in an embodiment, the unison ring 106 is coupled to the inner shaft 110 by a plurality of fasteners 110A. The inner shaft 110 is thus coupled to the plurality of crankshafts 104.

The pitch change mechanism 101 includes an actuator cylinder 112 and an actuator piston 114. A diameter of the actuator cylinder 112 is greater than a diameter of the actuator piston 114. The actuator cylinder 112 is coupled to the inner shaft 110. The actuator cylinder 112 is configured to move relative to the actuator piston 114 along a longitudinal axis 101A of the pitch change mechanism 101. In an embodiment, the actuator piston 114 is fixed in the longitudinal direction. The pitch change mechanism 101 also includes an actuator cylinder support 116 configured to support the actuator cylinder 112. The actuator cylinder support 116 is coupled to the actuator piston 114. The actuator cylinder support 116 contacts the actuator cylinder 112 via a plurality of sealing joints 112A at different points along the longitudinal axis 101A of the pitch change mechanism 101. In addition, the actuator cylinder support 116 further contacts the actuator piston 114. The sealing joints 112A are coupled to the actuator cylinder support 116 and are immovable when the actuator cylinder 112 moves relative to the actuator piston 114. In an embodiment, a sealing joint 112B is movable with the actuator cylinder 112 on a surface of the actuator piston 114 relative to the actuator piston 114. A back end of the actuator cylinder support 116 contacts a front end of actuator piston 114. A diameter of the actuator cylinder support 116 is greater than a diameter of the actuator piston 114. The actuator piston 114 has a cylinder portion 114A provided at a front end and a conical portion 114B provided at a back end. The cylinder portion 114A defines a chamber 114C of the actuator piston 114. In an embodiment, the sealing joint 112B moves with the actuator cylinder 112 on a surface of the cylinder portion 114A of the actuator piston 114.

The inner shaft 110 has a conical shape or a funnel-like shape that extends within a chamber 116A ("coarse chamber") defined by the actuator cylinder support 116. The inner shaft 110 has a conical portion 110B and a cylindrical portion 110C connected to the conical portion 110B. The actuator cylinder 112 is connected to the conical portion 110B of the inner shaft 110. The conical portion 110B extends radially to connect with the unison ring 106. The cylindrical portion 110C is configured to be enclosed within the chamber 116A defined by the actuator cylinder support 116 of the actuator cylinder 112.

The pitch change mechanism 101 also includes a mechanical pitch lock 118. The mechanical pitch lock 118 is provided within the chamber 116A of the actuator cylinder support 116. The mechanical pitch lock 118 includes an annular pitch lock member 118A that surrounds the cylindrical portion 110C of the inner shaft 110.

The pitch change mechanism 101 also includes an oil transfer bearing 120. The oil transfer bearing 120 is provided within the chamber 114C of the actuator piston 114. The oil transfer bearing 120 is coupled to the actuator piston 114 by a plurality of fasteners 120A. In an embodiment, the oil transfer bearing 120 includes an oil channel 122. In another embodiment, the oil transfer bearing 120 is attached to a static portion of the aircraft engine 100. Oil is supplied to the oil transfer bearing 120 through an oil conduit 124. For example, the oil is supplied from the oil conduit 124 to the oil transfer bearing 120 that in turn supplies oil to the oil channel 122 of the oil transfer bearing 120. The oil from the oil channel 122 is supplied to a chamber 112C ("fine chamber") defined by a space between the actuator cylinder 112 and the actuator piston 114. The oil supplied through the oil channel 122 into the chamber 112C moves the actuator cylinder 112 backward towards the conical portion 114B of the actuator piston 114. On the other hand, supplying oil through a central opening channel 123 in a central part of the oil transfer bearing 120 to the chamber 116A defined by the actuator cylinder support 116 moves the actuator cylinder 112 forward relative to the actuator piston 114, as will be described further in detail in the paragraph below.

In an embodiment, the pitch change mechanism 101 further includes a static interface 126 (e.g., bellows) coupled to the oil transfer bearing 120. The static interface 126 provides flexible support for the oil transfer bearing 120. The static interface 126 allows the oil transfer bearing 120 to follow pitch change mechanism 101 movement while connected to the static part of the aircraft engine 100.

In an embodiment, the pitch change mechanism 101 also includes a drain shield 128. The drain shield 128 is coupled to the actuator cylinder 112 at one end 128A and coupled to the conical portion 114B of the actuator piston 114 at an opposite end 128B. The end 128A is a movable sealing interface at the cylinder outer diameter while the opposite end 128B is fixed to the conical portion 114B of the actuator piston 114. The drain shield 128 is provided to shield or to isolate various components outside of the pitch change mechanism 101 in a case of an oil leak due to wearing of the sealing joint 112B that is movable. In an embodiment, the pitch change mechanism 101 further includes guiding rods 150. The guiding rods 150 are provided to tangentially locate the actuator cylinder 112.

Figure 2:
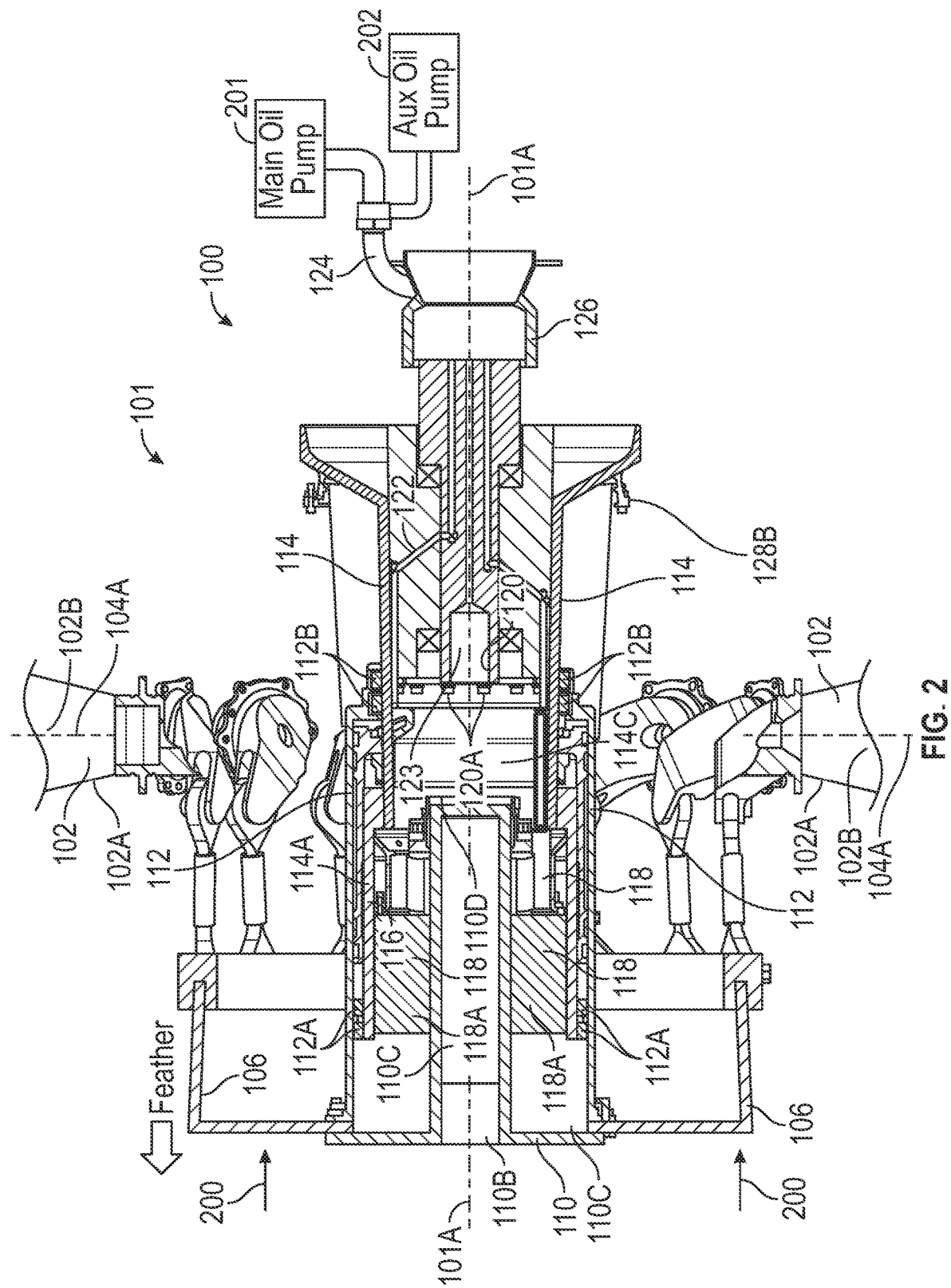
FIG. 2 shows a longitudinal cross-sectional view of the pitch change mechanism with the blades oriented in a feather position, according to an embodiment of the present disclosure.

FIG. 2 shows a longitudinal cross-sectional view of the pitch change mechanism 101 with the blades 102 oriented in a feather position, according to an embodiment of the present invention. As shown in FIG. 2, the feather position is an orientation of the blades 102 such that an edge 102A of the blades 102 is facing an airflow 200, or a face 102B of the blades 102 is parallel to the airflow 200. In the feather position, the actuator cylinder 112 is moved in a forward direction or to the left in FIG. 2.

As shown in FIG. 2, in the feather position, the actuator cylinder 112 is moved forward relative to the actuator piston 114. To move the actuator cylinder 112 forward relative to the actuator piston 114, oil at a certain pressure is provided to apply pressure on entire oil chamber 114C and, thus, apply a force to a back surface 110D of the cylindrical portion 110C of the inner shaft 110 to move the actuator cylinder 112 forward.

Figure 3:
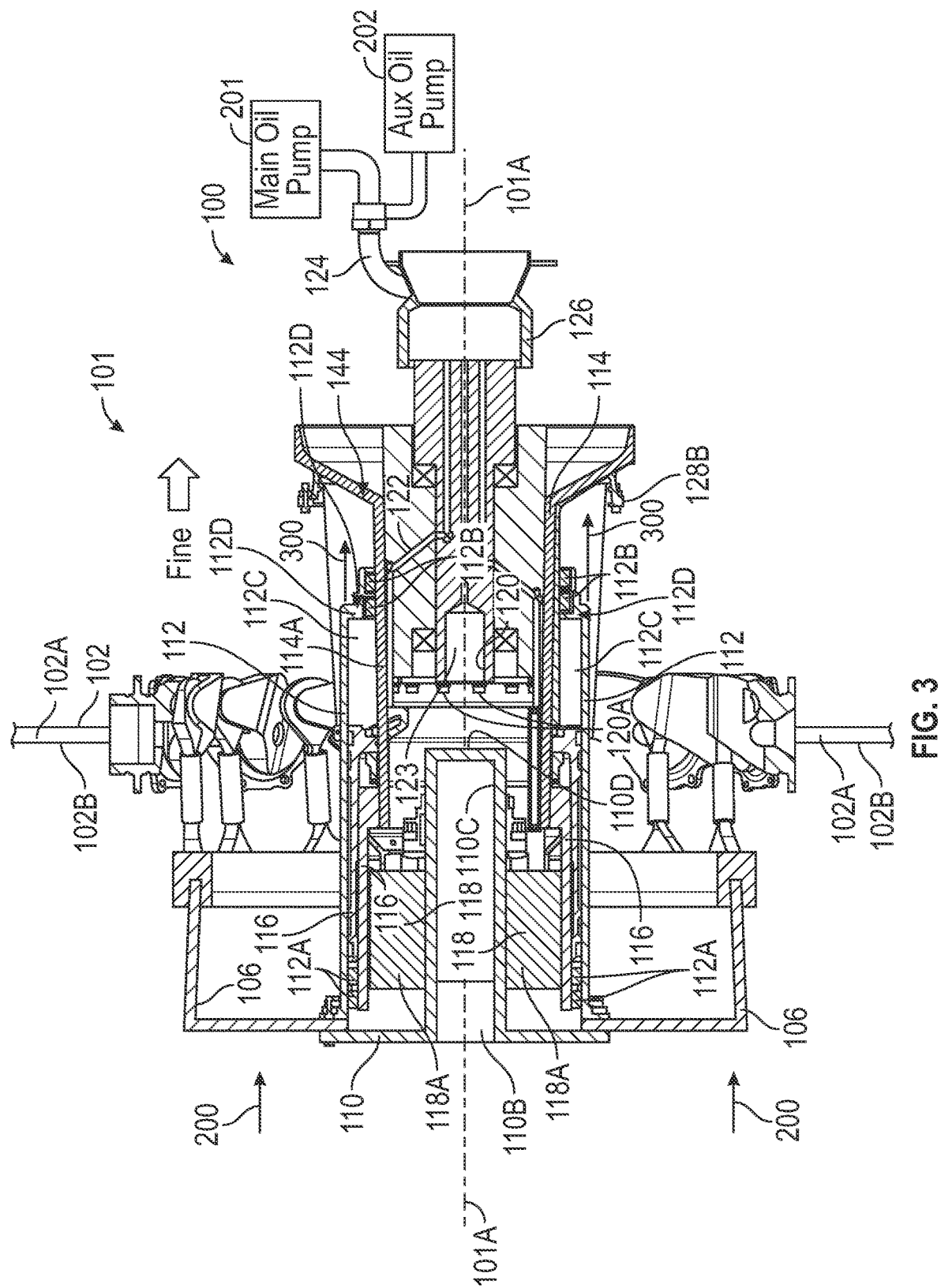
FIG. 3 shows a longitudinal cross-sectional view of the pitch change mechanism with the blades oriented in a fine position, according to an embodiment of the present disclosure.

FIG. 3 shows a longitudinal cross-sectional view of the pitch change mechanism 101 with the blades 102 oriented in a fine position, according to an embodiment of the present invention. As shown in FIG. 3, the fine position is an orientation of the blades 102 such that the face 102B of the blades 102 is generally perpendicular to the airflow 200. In the fine position, the edge 102A is facing generally perpendicular to the airflow 200. As shown in FIG. 3, in the fine position, the actuator cylinder 112 is moved backward relative to the actuator piston 114. To move the actuator cylinder 112 backward relative to the actuator piston 114, oil at a certain pressure is supplied through the oil conduit 124 to the oil transfer bearing 120 and through oil channel 122 to the chamber 112C between the actuator cylinder 112 and the actuator piston 114. The oil supplied through the oil channel 122 into the chamber 112C applied a pressure to the entire chamber 112C and, thus, applies a force (as shown by arrows 300) on the actuator cylinder 112, which moves the actuator cylinder 112 backwards. As the actuator cylinder 114 and the actuator cylinder support 116 are not movable, the oil in the chamber 112C applies a force on a back wall 112D of the actuator cylinder 112 to move the actuator cylinder 112 relative to the actuator piston 114 and the actuator cylinder support 116.

In the fine position, the actuator cylinder 112 is moved to a backward direction or to the right in FIG. 3. The blades 102 experience less drag in the feather position (shown in FIG. 2) than in the fine position (shown in FIG. 3).

The back wall 112D has a surface area smaller than a surface area of chamber 116A ("coarse chamber"). Therefore, for the same oil pressure, a greater magnitude force is generated by the actuator cylinder 112 to move the blades 102 into the feather position, whereas a lesser magnitude of force is generated by the actuator cylinder 112 to move the blades 102 into the fine position so as to ease actuation toward the feather (coarse) position.

The mechanical pitch lock 118 is provided as a fail-safe contingency when there is not sufficient oil pressure or an accidental drop of oil pressure occurs. In a case of a drop of oil pressure, the mechanical pitch lock 118 locks the pitch change mechanism 101 such that the orientation of the blades 102 is maintained.

The angle of the blades 102 relative to airflow 200 depends on flight conditions. Feather position is used to minimize drag. In normal operation, feather position is accomplished by means of a main engine oil pump 201. In case of engine shut down, the feather position is accomplished using an auxiliary hydraulic oil pump 202 that is electrically driven.

The pitch change mechanism 101 described above provides various benefits:
(a) No external movable seals are used in the chamber 116A (coarse chamber), as any use of a movable seal may be worn overtime which could lead to external oil leak. Therefore, a static external seal is instead used in the coarse chamber. The term static external seal is used herein to mean that the position of the seal between two components is not changed, or the seal is not movable. i.e., the relative position of the seal between two components is not changed.
(b) Guiding rods are provided to tangentially locate the actuator cylinder.
(c) The blade position can be controlled by a blade position control system.
(d) A closed control loop can be used by the blade position control system.
(e) An oil transfer bearing (OTB) 120 provides three oil lines: (1) a coarse line that feeds the coarse chamber to cause movement toward the feather position, (2) a fine line that feeds the fine chamber to cause movement toward the fine position, and (3) a pitch lock (PL) line, that upon pressurizing the PL line, unlocks the mechanical pitch lock. A lack of pressure in the PL line causes the mechanical pitch lock to engage and to lock the pitch of the blades.
(f) The oil transfer bearing (OTB) is supported by bearings and is exposed to the coarse chamber 116A to reduce or eliminate the need of additional connecting systems to reduce weight and complexity and supply oil pressure to move the actuator cylinder 112.

Further aspects of the present disclosure are provided by the subject matter of the following clauses.

A pitch change mechanism for an aircraft engine includes a unison ring, a plurality of crankshafts configured to receive a plurality of blades and each of the plurality of crankshafts having a longitudinal axis, an inner shaft coupled to the plurality of crankshafts and the unison ring, an actuator piston, and an actuator cylinder coupled to the inner shaft. The actuator cylinder configured to move relative to the actuator piston along a longitudinal axis of the pitch change mechanism. Movement of the actuator cylinder relative to the actuator piston is transferred to a rotation of each of the plurality of crankshafts around the longitudinal axis of each of the plurality of crankshafts to change a pitch of the plurality of blades.

The pitch change mechanism of the preceding clause, further including an oil transfer bearing, the actuator piston coupled to the oil transfer bearing to supply oil through the oil transfer bearing to move the actuator cylinder.

The pitch change mechanism of any preceding clause, further including a unison ring and a plurality of linkage yokes, each of the plurality of crankshafts coupled to the unison ring by a corresponding linkage yoke in the plurality of linkage yokes. The inner shaft is coupled to the unison ring.

The pitch change mechanism of any preceding clause, the unison ring coupled to the inner shaft by a plurality of fasteners.

The pitch change mechanism of any preceding clause, a diameter of the actuator cylinder being greater than a diameter of the actuator piston.

The pitch change mechanism of any preceding clause, further including an actuator cylinder support coupled to the actuator piston, the actuator cylinder support configured to support the actuator cylinder.

The pitch change mechanism of any preceding clause, the actuator cylinder support contacting the actuator cylinder via a first plurality of sealing joints at different points along the longitudinal axis of the pitch change mechanism.

The pitch change mechanism of any preceding clause, the first plurality of sealing joints coupled to the actuator cylinder support and being immovable when the actuator cylinder moves relative to the actuator piston.

The pitch change mechanism of any preceding clause, the actuator cylinder further contacting the actuator piston via a second sealing joint, the second sealing joint being movable with the actuator cylinder on a surface of the actuator piston relative to the actuator piston.

The pitch change mechanism of any preceding clause, further including a mechanical pitch lock provided within a chamber defined by the actuator cylinder support, the mechanical pitch lock configured to lock the pitch change mechanism.

The pitch change mechanism of any preceding clause, wherein the oil transfer bearing is provided within a chamber defined by the actuator piston, the oil transfer bearing having an oil conduit for supplying oil into a chamber defined by a space between the actuator cylinder and the actuator piston to move the actuator cylinder relative to the actuator piston.

The pitch change mechanism of any preceding clause, the oil transfer bearing provided within a chamber defined by the actuator piston.

The pitch change mechanism of any preceding clause, the inner shaft having a conical portion and a cylindrical portion connected to the conical portion, the conical portion extending radially to connect to the unison ring, the cylindrical portion configured to be enclosed within a chamber defined by the actuator cylinder.

The pitch change mechanism of any preceding clause, further including a drain shield coupled to the actuator cylinder and to the actuator piston, the drain shield configured to shield various components outside of the pitch change mechanism in case of an oil leak.

An aircraft engine including a plurality of blades and a pitch change mechanism. The pitch change mechanism includes a unison ring, a plurality of crankshafts configured to receive the plurality of blades and each of the plurality of crankshafts having a longitudinal axis, an inner shaft coupled to the plurality of crankshafts and the unison ring, an actuator piston, and an actuator cylinder coupled to the inner shaft. The actuator cylinder configured to move relative to the actuator piston along a longitudinal axis of the pitch change mechanism. Movement of the actuator cylinder relative to the actuator piston is transferred to a rotation of each of the plurality of crankshafts around the longitudinal axis of each of the plurality of crankshafts to change a pitch of the plurality of blades.

The aircraft engine of the preceding clause, the pitch change mechanism further including an oil transfer bearing, the actuator piston coupled to the oil transfer bearing.

The aircraft engine of any preceding clause, the pitch change mechanism further including an actuator cylinder support coupled to the actuator piston, the actuator cylinder support configured to support the actuator cylinder.

The aircraft engine of any preceding clause, the actuator cylinder support contacting the actuator cylinder via a first plurality of sealing joints at different points along the longitudinal axis of the pitch change mechanism.

The aircraft engine of any preceding clause, the first plurality of sealing joints coupled to the actuator cylinder support and are immovable when the actuator cylinder moves relative to the actuator piston.

The aircraft engine of any preceding clause, the actuator cylinder further contacting the actuator piston via a second sealing joint, the second sealing joint being movable with the actuator cylinder on a surface of the actuator piston relative to the actuator piston.

The aircraft engine of any preceding clause, wherein the pitch change mechanism further includes a mechanical pitch lock provided within a chamber defined by the actuator cylinder support, the mechanical pitch lock configured to lock the pitch change mechanism.

The aircraft engine of any preceding clause, wherein the aircraft engine is an open fan engine, an unducted fan engine, or a propeller engine having blades provided outside a nacelle of the aircraft engine.

The aircraft engine of any preceding clause, wherein each of the plurality of blades is linked to a corresponding one of the plurality of crankshafts of the pitch change mechanism.

A method of changing a pitch of a plurality of blades in an aircraft engine using a pitch change mechanism having a unison ring, a plurality of crankshafts coupled to the unison ring and configured to receive the plurality of blades, each of the plurality of blades being linked to a corresponding one of the plurality of crankshafts, each of the plurality of crankshafts having a longitudinal axis, an inner shaft coupled to the plurality of crankshafts and the unison ring, an actuator piston, and an actuator cylinder coupled to the inner shaft. The method includes moving the actuator cylinder relative to the actuator piston along a longitudinal axis of the pitch change mechanism. The method further includes transferring movement of the actuator cylinder relative to the actuator piston to a rotation of each of the plurality of crankshafts around a longitudinal axis of each of the plurality of crankshafts to change a pitch of the plurality of blades.

The method of the preceding clause, the pitch change mechanism further including an oil transfer bearing, the actuator piston coupled to the oil transfer bearing.

The method of any preceding clause, the pitch change mechanism further including an actuator cylinder support coupled to the actuator piston, the actuator cylinder support configured to support the actuator cylinder.

The method of any preceding clause, the actuator cylinder support contacting the actuator cylinder via a first plurality of sealing joints at different points along the longitudinal axis of the pitch change mechanism.

The method of any preceding clause, the first plurality of sealing joints coupled to the actuator cylinder support and are immovable when the actuator cylinder moves relative to the actuator piston.

The method of any preceding clause, the actuator cylinder further contacting the actuator piston via a second sealing joint, the second sealing joint being movable with the actuator cylinder on a surface of the actuator piston relative to the actuator piston.

The method of any preceding clause, wherein the pitch change mechanism further includes a mechanical pitch lock provided within a chamber defined by the actuator cylinder support, the mechanical pitch lock configured to lock the pitch change mechanism.

The method of any preceding clause, wherein the aircraft engine is an open fan engine, an unducted fan engine, or a propeller engine having blades provided outside a nacelle of the aircraft engine.

The method of any preceding clause, wherein each of the plurality of blades is linked to a corresponding one of the plurality of crankshafts of the pitch change mechanism.

Although the foregoing description is directed to the preferred embodiments of the present disclosure, other variations and modifications will be apparent to those skilled in the art, and may be made without departing from the spirit or the scope of the disclosure. Moreover, features described in connection with one embodiment of the present disclosure may be used in conjunction with other embodiments, even if not explicitly stated above.

The invention claimed is:
1. A pitch change mechanism for an aircraft engine, the pitch change mechanism comprising:
   a unison ring;
   a plurality of crankshafts coupled to the unison ring, the plurality of crankshafts configured to receive a plurality of blades and each of the plurality of crankshafts having a longitudinal axis;
   an inner shaft coupled to the plurality of crankshafts and the unison ring;
   an actuator piston fixed along a longitudinal axis of the pitch change mechanism; and an actuator cylinder coupled to the inner shaft, the actuator cylinder configured to move relative to the actuator piston along the longitudinal axis of the pitch change mechanism, wherein movement of the actuator cylinder relative to the actuator piston is transferred to a rotation of each of the plurality of crankshafts around the longitudinal axis of each of the plurality of crankshafts to change a pitch of the plurality of blades.

2. The pitch change mechanism according to claim 1, wherein the inner shaft has a conical portion and a cylindrical portion connected to the conical portion, the conical portion extending radially to connect to the unison ring, and the cylindrical portion configured to be enclosed within a chamber defined by the actuator cylinder.

3. The pitch change mechanism according to claim 1, further comprising a drain shield coupled to the actuator cylinder and to the actuator piston, the drain shield configured to shield various components outside of the pitch change mechanism in case of an oil leak.

4. The pitch change mechanism according to claim 1, further comprising an oil transfer bearing, the actuator piston coupled to the oil transfer bearing to supply oil through the oil transfer bearing to move the actuator cylinder.

5. The pitch change mechanism according to claim 4, wherein the oil transfer bearing is provided within a chamber defined by the actuator piston, the oil transfer bearing having an oil conduit for supplying oil into a chamber defined by a space between the actuator cylinder and the actuator piston to move the actuator cylinder relative to the actuator piston.

6. The pitch change mechanism according to claim 1, further comprising a plurality of linkage yokes, each of the plurality of crankshafts coupled to the unison ring by a corresponding linkage yoke in the plurality of linkage yokes.

7. The pitch change mechanism according to claim 6, wherein the unison ring is coupled to the inner shaft by a plurality of fasteners.

8. The pitch change mechanism according to claim 1, further comprising an actuator cylinder support coupled to the actuator piston, the actuator cylinder support configured to support the actuator cylinder.

9. The pitch change mechanism according to claim 8, further comprising a mechanical pitch lock provided within a chamber defined by the actuator cylinder support, the mechanical pitch lock configured to lock the pitch change mechanism to maintain the pitch of the plurality of blades.

10. The pitch change mechanism according to claim 8, wherein the actuator cylinder support contacts the actuator cylinder via a first sealing joint at different points along the longitudinal axis of the pitch change mechanism.

11. The pitch change mechanism according to claim 10, wherein the first sealing joint is coupled to the actuator cylinder support and is immovable when the actuator cylinder moves relative to the actuator piston.

12. The pitch change mechanism according to claim 10, wherein the actuator cylinder further contacts the actuator piston via a second sealing joint, wherein the second sealing joint is movable with the actuator cylinder on a surface of the actuator piston relative to the actuator piston.

13. An aircraft engine comprising:
a plurality of blades; and
a pitch change mechanism comprising:
a unison ring;
a plurality of crankshafts coupled to the unison ring, the plurality of crankshafts configured to receive the plurality of blades and each of the plurality of crankshafts having a longitudinal axis;
an inner shaft coupled to the plurality of crankshafts and the unison ring;
an actuator piston fixed along a longitudinal axis of the pitch change mechanism; and
an actuator cylinder coupled to the inner shaft, the actuator cylinder configured to move relative to the actuator piston along the longitudinal axis of the pitch change mechanism,
wherein movement of the actuator cylinder relative to the actuator piston is transferred to a rotation of each of the plurality of crankshafts around the longitudinal axis of each of the plurality of crankshafts to change a pitch of the plurality of blades.

14. The aircraft engine according to claim 13, wherein the pitch change mechanism further comprises an oil transfer bearing, the actuator piston coupled to the oil transfer bearing to supply oil through the oil transfer bearing to move the actuator cylinder.

15. The aircraft engine according to claim 14, wherein the oil transfer bearing is provided within a chamber defined by the actuator piston, the oil transfer bearing having an oil conduit for supplying oil into a chamber defined by a space between the actuator cylinder and the actuator piston to move the actuator cylinder relative to the actuator piston.

16. The aircraft engine according to claim 13, further comprising an actuator cylinder support coupled to the actuator piston, the actuator cylinder support configured to support the actuator cylinder.

17. The aircraft engine according to claim 16, wherein the actuator cylinder further contacts the actuator piston via a second sealing joint, and the second sealing joint is movable with the actuator cylinder on a surface of the actuator piston relative to the actuator piston.

18. The aircraft engine according to claim 16, further comprising a mechanical pitch lock mechanism provided within a chamber defined by the actuator cylinder support, the mechanical pitch lock mechanism configured to lock the pitch change mechanism to maintain the pitch of the plurality of blades.

19. The aircraft engine according to claim 16, wherein the actuator cylinder support contacts the actuator cylinder via a first sealing joint at different points along the longitudinal axis of the pitch change mechanism.

20. The aircraft engine according to claim 19, wherein the first sealing joint is coupled to the actuator cylinder support and is immovable when the actuator cylinder moves relative to the actuator piston.

* * * * *